UNITED STATES PATENT OFFICE.

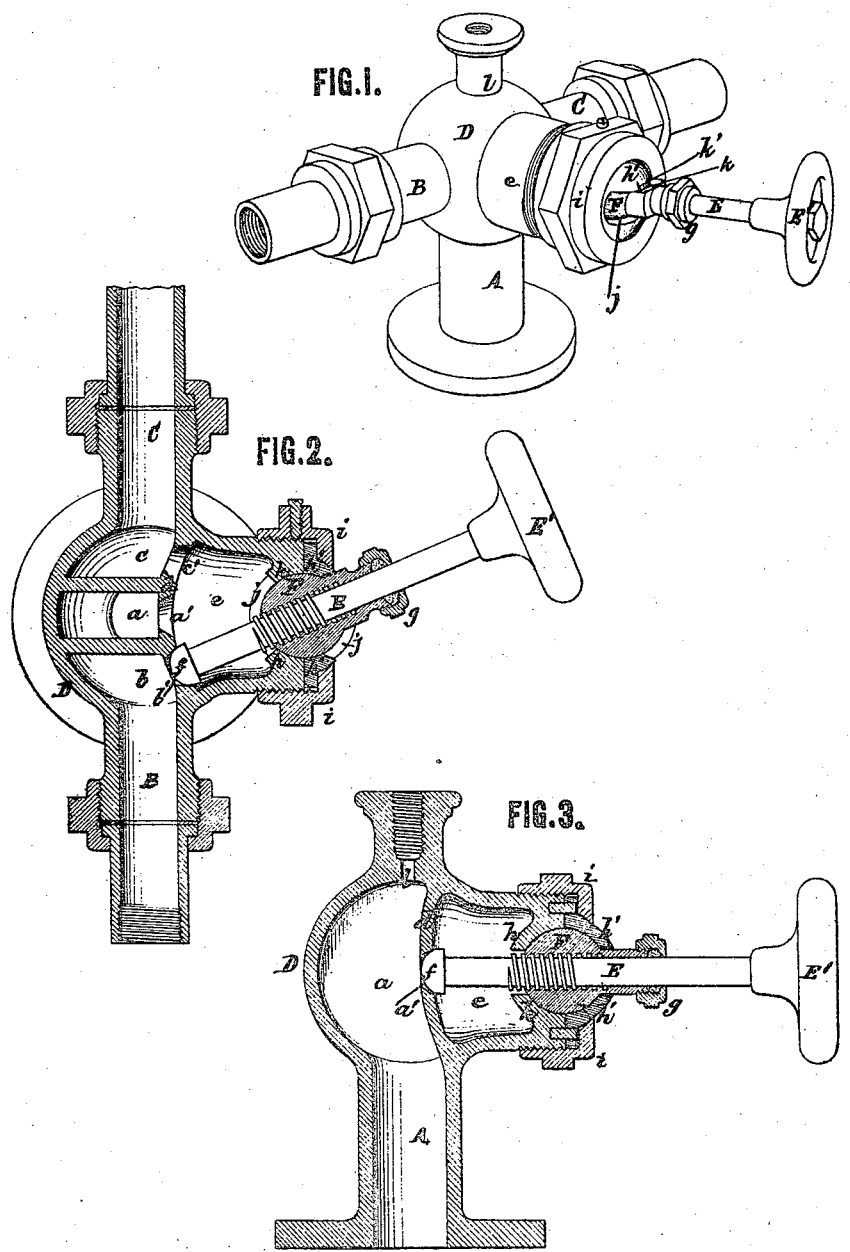

ISIDORE DREYFUS, OF NEW YORK, N. Y.

IMPROVEMENT IN VALVES AND COCKS.

Specification forming part of Letters Patent No. 111,621, dated February 7, 1871.

*To whom it may concern:*

Be it known that I, ISIDORE DREYFUS, of the city, county, and State of New York, have invented certain new and useful Improvements in Valves and Cocks, of which the following is a specification:

My invention relates to valves and cocks for controlling and directing the flow of gas, water, and other liquids and fluids, and it has reference more particularly to that class of such valves and cocks in which the movement of the valve is controlled by means of a valve-stem moving longitudinally toward and away from the valve-opening; the object of the invention being to produce a valve or cock of this character in which a series of valve openings or ports is controlled by a single valve and stem.

The invention consists, first, in mounting the valve-stem in a ball-and-socket or equivalent bearing, which may be moved or rotated so as to change the line of direction of the stems, and bring it opposite to any one of the several ports or openings which the valve is designed to close; second, in a valve or cock provided with a series of ports or valve-openings, and a single valve-stem having a movement toward and away from said ports, and mounted in a ball-and-socket or equivalent bearing in such manner that it may be directed to or brought in line with any one of the ports which the valve is required to close; third, in minor details of construction, to be hereinafter described.

The manner in which my invention is or may be carried into effect will be readily understood by reference to the accompanying drawing, in which—

Figure 1 is a perspective view of a three-way valve or cock made in accordance with my invention. Fig. 2 is a horizontal section, and Fig. 3 is a vertical section, of the same, both sections being made through the center of the valve.

The exterior shell or case of the valve or cock may be of any suitable form. In the present instance three passages or conduits, A B C, are provided, which open into a central bulb or chamber, D, divided into three compartments, *a b c,* which communicate with the respective passages or conduits above named. In front of this chamber, and separated from it by a diaphragm or wall, *d*, is a valve-chamber, *e*, in which is located the valve *f*, mounted upon the end of a valve-stem, E. Each of the compartments *a b c* communicates with the chamber *e* through a valve opening or port, *a′, b′,* or *c′,* formed in diaphragm *d*, as shown in Figs. 2 and 3.

In order that the valve *f* may be brought to bear upon either one of the valve seats or ports *a′ b′ c′,* I mount the valve-stem in a ball-bearing, F, which can turn in a socket formed for it in the shell or case D, so as to change the direction of the valve-stem and bring the valve *f* opposite to any one of the ports.

The valve-stem passes through the ball-bearing, and is provided with a screw-thread engaging with a corresponding thread formed in the bearing, whereby, by turning the handle E′, the stem and valve will be moved toward or away from the port or seat opposite which the valve may happen to be.

The ball-joint is provided with a stuffing-box, *g*, surrounding the valve-stem, to prevent escape of gas or steam; and for the same purpose the ball-and-socket bearing is made steam-tight.

One part of the socket *h* is cast with or fixed to the shell D. The other part, *h′*, is movable, and is held down upon the other part by means of a screw-collar, *i*, or other suitable means, the joints between these parts being made steam-tight, as above stated.

In the socket *h h′*, I form slots *j*, which lie in the same plane with the valve seats or ports *a′ b′ c′,* so that the valve-stem can only move or oscillate in that plane. The length of the exterior slot is such that when the stem is carried over to the end of the slot shown in the drawing it and the valve will be in line with the port *b′* diagonally opposite, when it is swung to the other end of the slot it will be in line with the port *c′,* and when in the center of the slot, midway between the two ends, it will be opposite the central port, *a′*, this latter position being readily ascertained by bringing a notch, *k,* on the stem or bearing opposite a corresponding notch or mark, *k′,* upon the socket.

Thus a single valve and valve-stem may be used to control and close any one of a series of valve openings or ports, this result being due to the peculiar bearing for the valve-stem, which bearing becomes in effect the axis of oscillation of the stem. It is manifest that this bearing need not be a ball or of spherical shape, but may be otherwise formed; and I contemplate constructing it in various ways, preserving under all circumstances, however, the one essential feature—viz., the capacity of moving so as to change the line of direction of the valve-stem, and thus bring the valve opposite any one of the series of ports; and, also, it is not absolutely necessary that the valve-stem should screw down through the bearing, as the longitudinal movement of the valve and stem necessary in order to open or close the ports may be effected by other means.

The movement of the valve and stem depends, of course, upon the relative position of the ports, which may be placed in any desired position, though I much prefer the arrangement shown in the drawing.

Other means than the slot $j$ may be employed to assure the position of the valve with respect to the ports. If, for instance, the bearing F were cylindrical instead of spherical, and fitted in a correspondingly cylindrical socket, the slots would be unnecessary, for the reason that the bearing, on account of its shape, could only revolve in one plane, and not in all directions, like the sphere or ball.

The valve or cock thus constructed is useful for a variety of purposes. Suppose the central channel, A, to be connected with a source of steam-supply, the channel B with an injector, and the other one, C, with a blower. By closing the channel B, as shown, communication is maintained between the channels A and C, steam passing from the central port, $a'$, through the valve-chamber and into the side port, $c'$. By shifting the valve to the port $c'$, communication will take place between A and B. By screwing back the valve from the port $c'$, the channel A will communicate with B and C simultaneously, and by screwing the valve down into the central valve-seat, $a'$, the supply of steam will be instantaneously shut off from both the side channels.

As the valve shown in the drawing is adapted more particularly for use as a steam valve or cock, I have provided upon the top of the case D a neck, which is adapted to receive a steam-gage communicating with the chamber $a$ through a small channel, $l$. It may be used also for regulating the flow of gas or water, turning it in one direction exclusively, or allowing it to pass in both directions. It may also be used with gas, air, water, and other pumps with pneumatic apparatus, blast or other furnaces, for the injection or discharge of air, gases, &c., into or from said furnaces, or for the filling or supplying of the same. In short, it may be used in every connection in which ordinary three-way cocks are now employed.

If desired, the diaphragm $d$ may be curved, the curve following a circle described in the plane of oscillation of the valve-stem, with a radius equal to the distance of the center port, $a'$, from the axis of oscillation of the stem. A very slight curve, however, will suffice, and, indeed, the diaphragm may be formed without curve, as in such case the valve would only require to be screwed in a little farther when closing the side ports.

Having now described my invention, and the manner in which the same is or may be carried into effect, what I claim, and desire to secure by Letters Patent, is—

1. A valve or cock provided with a series of ports or valve-openings, in combination with a single valve and valve-stem having a movement toward and away from said ports, and mounted or supported in a ball-and-socket or equivalent bearing, as described, in such manner that the stem may be directed to or brought in line with any one of the ports which the valve is required to close, substantially as and for the purposes set forth.

2. The central bulb or chamber, divided into three channels or compartments, communicating with one another through ports formed in a diaphragm separating them from the valve-chamber, in combination with an oscillating valve operating substantially as shown and set forth.

3. The combination of the screw-threaded valve-stem, its rotatory or movable bearing mounted in the case or shell of the valve or cock, as described, and the stuffing-box formed upon said bearing, for making a steam-tight joint between it and the stem, as shown and set forth.

4. The combination, with the valve openings or ports, of the oscillating valve, its movable bearing, and the socket which contains said bearing, the said socket being provided with a slot or slots for the passage of the valve-stem formed in the plane which passes through said ports, substantially as and for the purposes set forth.

In testimony whereof I have signed my name to this specification before two subscribing witnesses.

ISIDORE DREYFUS.

Witnesses:
JOHN G. ROBB,
H. H. NIEMANN.